Feb. 21, 1967  E. D. PHILLIPS  3,305,211
STRESSED PLASTIC VALVE FOR LABORATORY GLASSWARE
Filed March 9, 1965  4 Sheets-Sheet 1
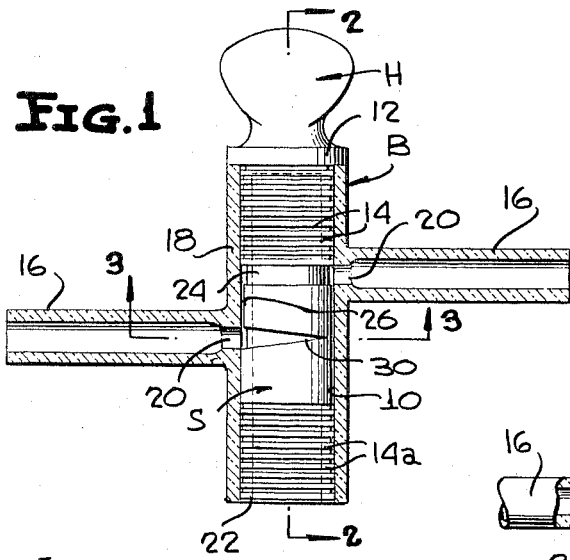
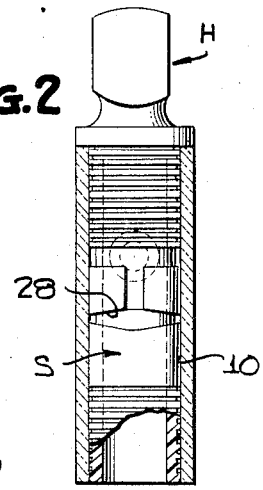
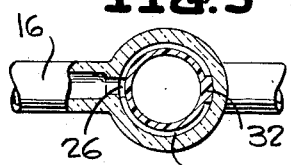
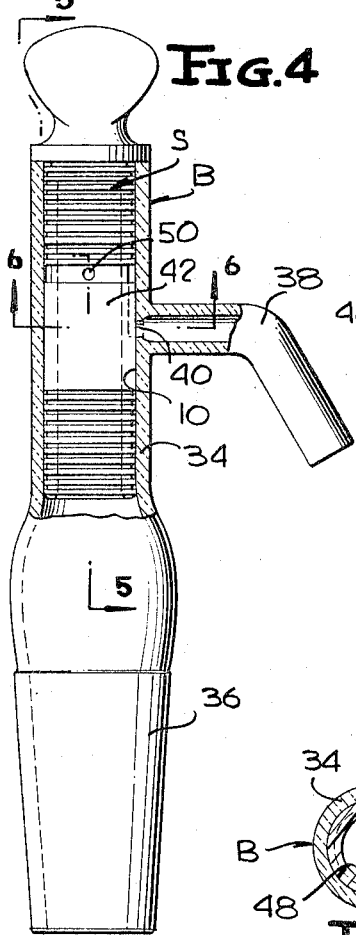
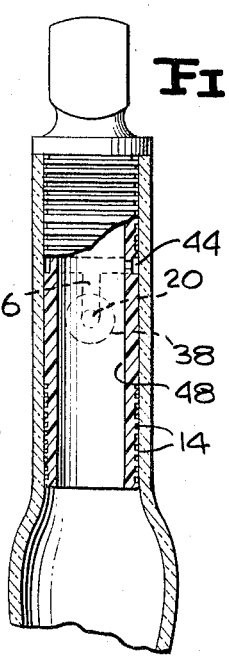
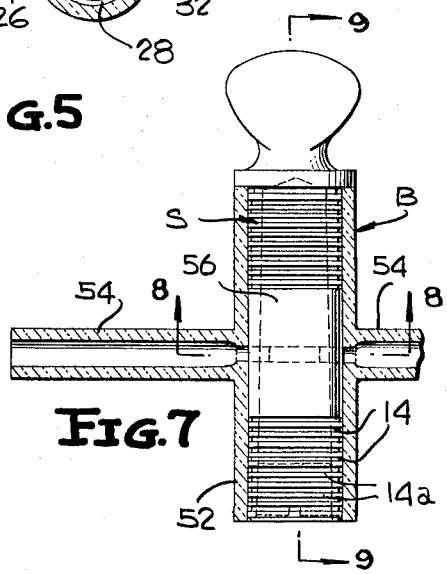
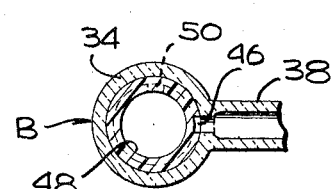
INVENTOR
EDWIN D. PHILLIPS
BY *Shoemaker and Mattare*
ATTORNEYS Feb. 21, 1967 E. D. PHILLIPS 3,305,211
STRESSED PLASTIC VALVE FOR LABORATORY GLASSWARE
Filed March 9, 1965 4 Sheets-Sheet 2
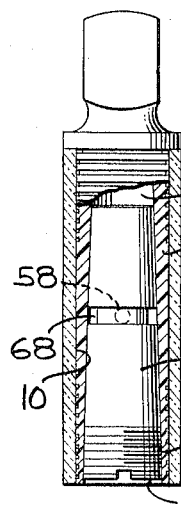
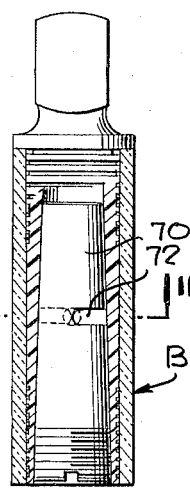
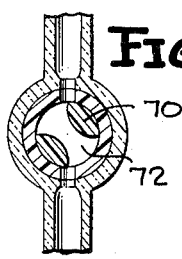
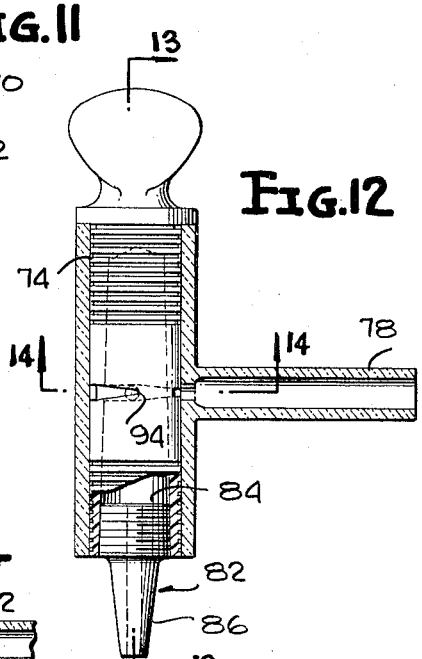
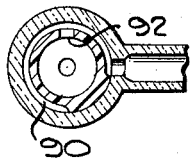
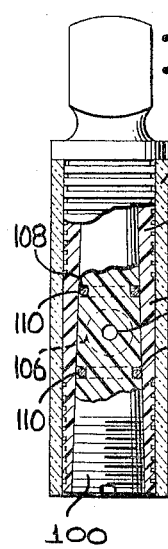
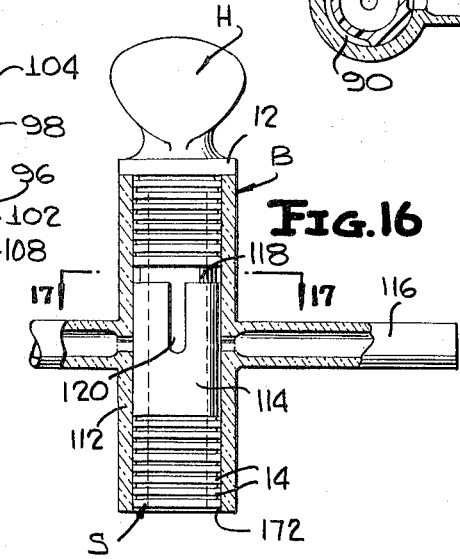
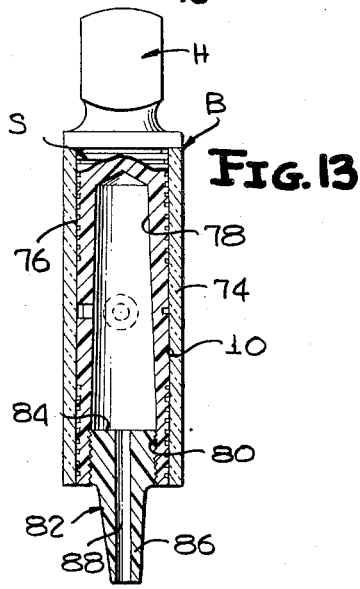
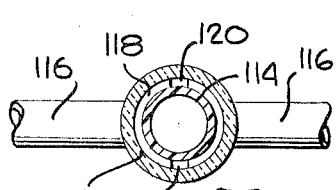
INVENTOR
EDWIN D. PHILLIPS
BY *Shoemaker and Mattare*
ATTORNEYS Feb. 21, 1967     E. D. PHILLIPS     3,305,211
STRESSED PLASTIC VALVE FOR LABORATORY GLASSWARE
Filed March 9, 1965                                        4 Sheets-Sheet 3
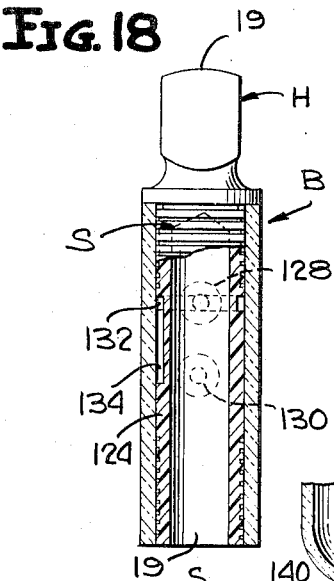
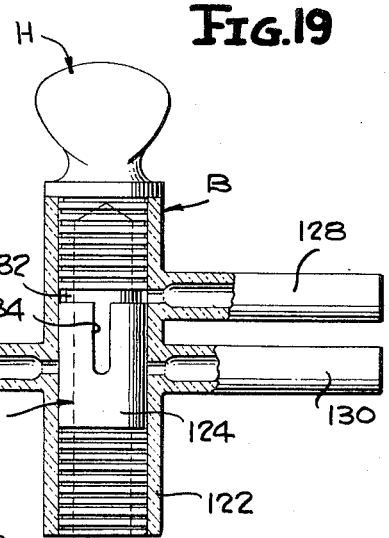
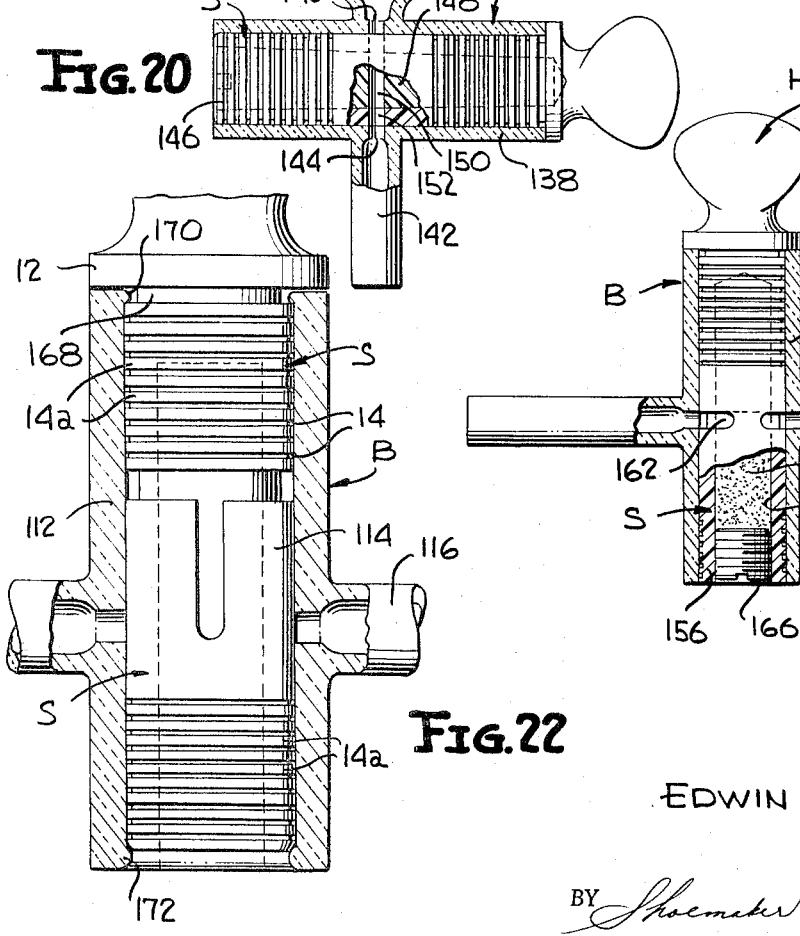
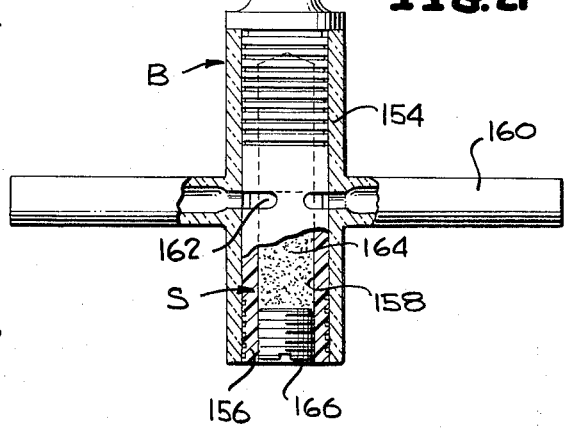
INVENTOR
EDWIN D. PHILLIPS
BY *Shoemaker and Mattare*
ATTORNEYS Feb. 21, 1967 E. D. PHILLIPS 3,305,211
STRESSED PLASTIC VALVE FOR LABORATORY GLASSWARE
Filed March 9, 1965 4 Sheets-Sheet 4

INVENTOR
EDWIN D. PHILLIPS

BY *Shoemaker and Mattare*

ATTORNEYS

United States Patent Office 3,305,211
Patented Feb. 21, 1967

3,305,211
STRESSED PLASTIC VALVE FOR
LABORATORY GLASSWARE
Edwin D. Phillips, 170 Albert St.,
North Plainfield, N.J. 07063
Filed Mar. 9, 1965, Ser. No. 446,763
3 Claims. (Cl. 251—309)

This is a continuation-in-part of application Serial No. 287,962, filed June 14, 1963, now abandoned, for Stressed Plastic Valve for Laboratory Glassware.

This invention relates generally to improvements in laboratory glassware and is directed particularly to improvements in valve structure for the same.

In laboratory glassware the use of valves is extensively made for controlling the flow of fluids, either liquid or gaseous for the purpose of regulating the quantity of such fluid passing through apparatus or through tubes leading from one piece of apparatus to another, or for diverting the flow of fluid to different fluid lines. In any case it is particularly important that the valves used be constructed in such a manner as to maintain a complete fluid tight condition when closed or partially closed. By this it is meant that when the valve is completely closed it must be so tight as to prevent leakage of fluid, gaseous or liquid, from one side to the other and under all conditions the rotary portion of the valve must fit in the barrel with such a degree of tightness as to prevent fluid leakage along the length of the barrel to the ends thereof. On the other hand, the degree of tightness of the plug in the barrel of the valve must not be such as to make the operation of the valve difficult.

Present laboratory all-glass valves are made by grinding a taper into a glass sleeve or barrel and then lapping in a glass valve stem or plug to fit securely in the sleeve. A spring clip is then used on the smaller end of the stem or plug to draw the latter firmly onto the seat. Such valve habitually becomes tight, upon being turned to a point where it is difficult to open and close the valve and accordingly the use of a suitable lubricant is required. This is not entirely satisfactory, since the lubricant frequently gets onto the hands of the operator and thus on the glassware.

Valves have been made wherein the stem or plug is formed of a synthetic resin, of the fluoro-carbon type, such as tetrafluoroethylene, and the copolymer of tetrafluoroethylene and fluorinated ethylene propylene, known in the trade as Teflon, the plug being made with a taper as in the glass valve plug. Such plastic stem or plug valves are not entirely satisfactory due to the fact that they are expensive to make due to the labor involved in making the taper of the stem, or plug, and of the sleeve to accurately match. Accordingly, such valves leak and if they may be made sufficiently tight initially, they will leak after a period of use and after being drawn onto the barrel seat, due to cold flow of the plastic material.

In view of the foregoing the present invention has for a principal object to provide a laboratory glassware valve embodying a thermoplastic rotary stem or plug and glass sleeve, designed in a novel manner whereby a tight leakproof engagement will be maintained at all times between the contacting or opposing surfaces of the plastic stem, or plug, and the glass sleeve or barrel.

A further object of the invention is to provide a valve structure of the character stated, wherein the thermoplastic stem is designed in such a manner as to utilize the cold flow characteristic of the plastic under stress to form, maintain, and ensure a tight fit between the parts and thus secure the desired seal.

Another object of the invention is to provide a valve structure embodying a sleeve or barrel or straight cylindrical bore, and a thermoplastic stem or plug of straight externally cylindrical form and wherein means is provided for effecting a prestressing of the valve stem or plug in the barrel to cause cold flow of the plastic material whereby it will exert the necessary pressure against the wall of the sleeve or barrel to form a tight leakproof seal.

Still another object of the invention is to provide an improved valve construction wherein the stem or plug is formed in a novel manner to facilitate gradual reduction of flow through the barrel between two or more pipe lines.

A still further object of the invention is to provide a burette type of valve or stopcock having a novel drip tip at the bottom end of the plug and formed of a thermoplastic resin, such as Teflon, threaded into a stem of the same material and functioning to expand or increase the outside diameter of the stem to effect and maintain a tight leakproof connection between the stem and the opposing wall of the encasing barrel or sleeve.

The invention will be best understood from a consideration of the following detailed description taken in connection with the accompanying drawings, wherein:

FIG. 1 is a view partly in longitudinal section and partly in elevation of a valve constructed in accordance with one embodiment of the present invention.

FIG. 2 is a longitudinal section taken substantially on the line 2—2 of FIG. 1.

FIG. 3 is a transverse section taken on the line 3—3 of FIG. 1.

FIG. 4 illustrates, partly in longitudinal section and partly in side elevation, a take-off valve or stopcock and flask stopper, constructed in accordance with the present invention.

FIG. 5 is a longitudinal section taken substantially on the line 5—5 of FIG. 4.

FIG. 6 is a transverse section taken substantially on the line 6—6 of FIG. 4.

FIG. 7 illustrates another construction embodying an expansion plug threaded into the hollow stem for expanding the stem, the plug having a circumferential passage for through flow of fluid between opposite nipples.

FIG. 8 is a transverse section taken substantially on the line 8—8 of FIG. 7.

FIG. 9 is a longitudinal section taken substantially on the line 9—9 of FIG. 7.

FIG. 10 is a longitudinal section through a construction similar to FIG. 7 but illustrating another form of expansion plug.

FIG. 11 is a transverse section taken substantially on the line 11—11 of FIG. 10.

FIG. 12 is a view partly in longitudinal section and partly in elevation of a burette valve or stopcock having an outlet through the bottom of the plug and illustrating a spiral flow channel in the surface of the plug.

FIG. 13 is a longitudinal section taken substantially on the line 13—13 of FIG. 12.

FIG. 14 is a transverse section taken substantially on the line 14—14 of FIG. 12.

FIG. 15 illustrates a modified form of expansion plug in the valve stem, in which the expansion plug carries spaced sealing rings.

FIG. 16 illustrates another construction, the valve stem being an elevation and the sleeve being in longitudinal section and showing another design of flow passage in the surface of the stem.

FIG. 17 is a transverse section taken substantially on the line 17—17 of FIG. 16.

FIG. 18 illustrates a construction and longitudinal section, similar to FIG. 16 but showing a three-way flow arrangement.

FIG. 19 is a longitudinal section on line 19—19 of FIG. 18 illustrating the construction of FIG. 18 and showing the three-way nipples on the valve sleeve or barrel.

FIG. 20 illustrates the lower portion of a burette and valve construction, in which the valve stem is shown in elevation.

FIG. 21 illustrates another embodiment of the invention utilizing compressible granular material with a compression plug in a hollow stem for effecting lateral compression of the stem in the sleeve.

FIG. 22 is a detail view on an enlarged scale of a longitudinally sectioned sleeve with a thermoplastic plug stem therein and illustrating the circumferential grooving of the stem at opposite sides of the flow channel and also illustrating a locking beading arrangement between the stem body and the barrel or sleeve body.

Figure 23:
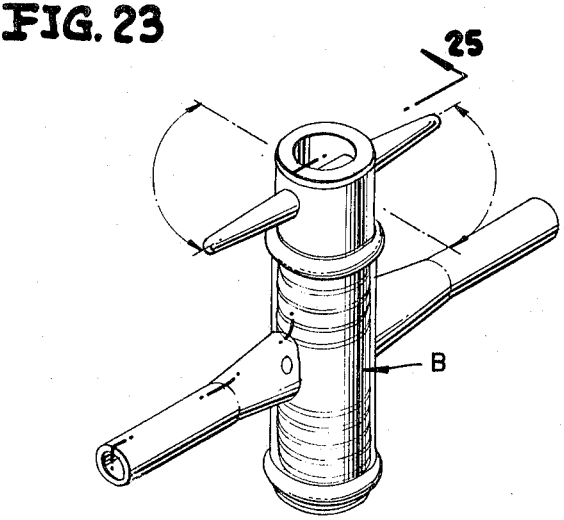
FIG. 23 is a view in perspective of another embodiment of the valve or stopcock structure.
Figure 24:
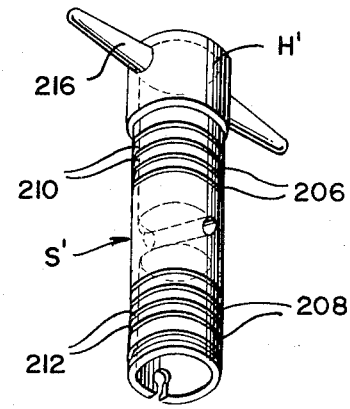
FIG. 24 is a view in perspective of the rotary plug of the structure illustrated in FIG. 23.

Referring now more particularly to the drawings, it will be seen that the valve or stopcock construction of the present invention in each of the illustrated embodiments thereof, comprises a barrel or sleeve of straight cylindrical form and generally designated B, into which is inserted a stem or plug, generally designated S, which is also of straight cylindrical form and has at one end an integral head H. These general reference characters will be used throughout for the different embodiments of the valve together with individual reference numerals for specific parts of the valve structure of each embodiment.

Preferably the barrel or sleeve B is formed of glass. This barrel, as above stated, has a straight bore which is of constant diameter throughout the length thereof or throughout that portion of its length with which the exterior of the stem S is in contact. That is, the bore, designated 10 in each embodiment is as nearly constant in diameter throughout its length as is possible to make the same. However, slight variations in the diameter or any inequalities in the circularity of the interior of the bore, if such occurs, will have no effect upon the tightness of the valve as the fit of the stem or plug in the sleeve is such as to avoid any leakage. In other words, the stem of the valve conforms itself to irregularities in the cylinder surface so that if the cylinder should be slightly out-of-round, this will not affect the tightness of the fit of the stem in the barrel.

The stem S in each instance is formed throughout with the head thereof, of the plastic Teflon.

At the head end of the stem in each of the embodiments of FIGS. 1 to 22, a collar 12 is formed which is of larger diameter than the body portion of the stem and bears against one end of the barrel or sleeve when the stem is in operative position therein, as illustrated in the several figures referred to.

As will be hereinafter specifically described, the stem S in each embodiment is provided substantially midway between its ends and in its surface with means for conducting fluid transversely of the valve structure.

The novel tight leakproof engagement between the interior surface of the barrel or the surface of the bore of the barrel and the exterior surface of the stem, is effected in accordance with the present invention by the novel prestressing of the thermoplastic material in the barrel or sleeve whereby cold flow of the plastic will force the body of the stem outwardly and tightly against the surface of the bore of the sleeve. Such prestressing of the stem is transversely of or normal to the axis of the stem and sleeve wall or parallel to the wall.

A particular advantage of the present invention, in forming the barrel and stem straight, throughout, resides in the fact that no tapering of the cooperating surfaces of the parts is required, and consequently, in addition to the fact that no grinding and lapping-in is called for, there is no requirement that spring clips be used or that nuts be threaded on the ends of the stems, to draw or pull the stem longitudinally into tight engagement with its seat.

Each of the Teflon stems, after being turned or shaped to the proper outside diameter, has formed therein and therearound, in a portion thereof on each side of the centrally located flow passages, a multiplicity of relatively fine encircling grooves 14, thereby forming the fine circular ribs 14a.

In certain of the stems as hereinafter set forth, the portions of the stem in which these ribs are formed, are made slightly oversize with respect to the diameter of the bore of the barrel or sleeve in which they are formed. This oversize is approximately $10/1000$ of an inch. The grooves are spaced about $15/1000$ to $20/1000$ of an inch apart and approximately 10 or 12 of the ribs are thus formed in each of the portions of the stem. The depth of each groove may also be approximately the same as the spacing apart of the grooves or a slightly larger spacing between the grooves may be used.

The ribs 14a when made oversize as stated will permit the valve stem to be forced into the barrel or sleeve and in being so forced into the sleeve, the ribs will be compressed and will thus form a tight seal with the surface of the bore.

In the central area of the stem, between the two groups of ribs, the stem may be made of approximately the same diameter as the barrel bore and thus will not offer any resistance to the forcing of the stem into the bore. The ribs preferably extend all the way to the ends of the sleeve.

A straight cylindrical stem such as that employed in the valves of this invention, if made of a diameter to obtain a slight press fit, to avoid leakage, is almost impossible to insert into a barrel, because of the length of the stem, and is much too difficult to turn because the applied stress is too high. By the provision of the fine grooves in the body of the stem and in relatively large number at opposite sides of the central portion in which the flow passages are formed, only the tops of the ribs receive interference or resistance and because of the narrowness of the ribs, they will be compressed, or pre-compressed, when the stem is forced into the barrel and will then react to impose a firm pressure against the bore of the valve and form a tight seal.

The valve stems in the embodiments shown in FIGS. 1 to 22, to which embodiments the following description is particularly directed, up to and including FIG. 22, are hollow or tubular and the hollow centers are open at the end of the barrel opposite from the head and in some instances, as shown in certain of the embodiments hereinafter to be described, means is provided within the hollow stem for exerting an expansive pressure to force the ribs of the stem against the surface of the sleeve bore. In these embodiments, while the ribs may be formed oversize, if desired, this is not absolutely necessary in order to obtain a tight seal since the imposition of outward pressure from within the stem will bring about the desired result.

In FIGS. 1 to 3, the valve barrel is illustrated as being formed with the oppositely located nipples 16. The barrel and nipples are shown as being formed of glass and the nipples are fused to the body 18, in the conventional manner, opening into the bore 10 by way of the reduced neck portion 20.

The nipples 16 are shown off-set one from the other in the longitudinal direction of the barrel, however, they may be suitably bent to bring the outer end portions in alignment while the apertured throats 20 at the inner ends are in the offset position shown.

The stem here shown is hollow from the end remote from the head to the opposite end near the collar 12. This hollow form contributes to some extent to the required compressibility of the stem, although the actual sealing effect results from the deformation of the ribs as the stem is forced into the undersize bore 10 of the barrel or sleeve.

The body portion 22 of the stem if formed in the outer surface thereof with a novel flow channel configuration by means of which a rate of flow of fluid from one nipple to the other may be graduated from a full flow down to a very slow flow just prior to the complete shutting off of the flow entirely. In this flow channel arrangement there is provided the annular channel 24 which encircles the body 22 and is in the plane of one of the openings 20, here shown as the opening for the uppermost nipple 16. This channel communicates with the short longitudinally extending channel 26 which, in turn, communicates with the spiral or incompletely circular channel 28 which is in the plane of the other nipple opening 20. This incompletely circular channel is shown as having an area of major width, see FIG. 2, which tapers off toward the opposite ends of the channel to zero width as indicated at 30. Thus it will be seen that by rotating the stem to a position where the major width portion of the channel 28 registers with the adjacent neck opening 20, full flow of fluid may be realized from one nipple to the other and when the flow is to be reduced, this is effected by rotating the stem in either direction to bring the gradually narrowing portion of the channel around with respect to the adjacent opening 20 and if the flow is to be fully shut off, then the non-channeled portion 32 intervening between the ends of the channel 28 is brought into position to cover the adjacent opening 20, as will be readily apparent, particularly upon reference to FIG. 3.

While the channel 28 has been illustrated in FIG. 2 as having its maximum width in between the two ends thereof, it may be formed to have its maximum width extend from one end of the channel around to the opposite end and to be gradually reduced in width from the wider end to the opposite end of zero width.

FIG. 4 illustrates a valve structure combined with a flask stopper. In this embodiment the body 34 of the barrel is formed at one end integral with the tubular ground glass flask stopper 36. A single nipple 38 is joined to the barrel body and communicates with the bore 10 thereof through the neck opening 40.

In this embodiment the body 42 of the stem is provided in its outer surface with the encircling flow channel 44 and with the short longitudinal extension thereof as indicated at 46, which extension is adapted to communicate at its lower end with the opening 40.

The stem of this embodiment is hollow as shown, so that the open lower end thereof may communicate through the stopper 36 with a flask and the hollow interior 48 of the stem communicates with the circular flow channel 44 by way of the radial bore 50.

FIGS. 7, 8, and 9 illustrate an embodiment of the valve structure employing a means for prestressing the Teflon valve stem parallel to the valve wall or to the axis of the stem. In this construction the body 52 of the barrel B is shown as having the opposite nipples 54 in communication with the interior or bore of the valve barrel and the stem has the body 56 thereof formed with the opposite radial apertures 58 which open through the wall of the stem into the hollow interior thereof.

The hollow interior of the body 56 forms a chamber 60 which is slightly tapered from the open end of the chamber as shown in FIG. 9, and the chamber at its outer end is screw threaded as indicated at 62.

The numeral 64 designates a tapered expansion plug which is adapted for extension into the tapered chamber 60 and this plug at its outer end is screw threaded as indicated at 66 for threaded engagement with the larger outer end of the chamber whereby upon threading the expansion plug inwardly, this effects a prestressing axially along the screw which by the effect of cold flow will force the body 56 outwardly tightly against the wall or surface of the bore 10 of the barrel.

The surface of the expansion plug 64 is provided with the circumferential flow channel 68 located in a transverse plane for communication with or register with the radial apertures 58.

FIGS. 10 and 11 illustrate the same construction in the valve barrel and in the body of the stem as is shown in the adjacent FIG. 9. However, the expansion plug of this embodiment, designated 70, is provided with the transverse through passage 72 as shown in FIG. 11, which passage, while it may be of any suitable form or configuration, is here illustrated as being narrower between its ends than at the opposite ends or, in other words, it is illustrated as having a substantially hour-glass form.

FIGS. 12 to 14 inclusive, illustrate the application of the present invention to a burette stopcock of the type having an outlet through the bottom of the stopcock plug and combined with the means for prestressing parallel to the axis of the stem for acquiring a tight leakproof engagement between the stem and the bore of the barrel.

In this embodiment of the invention the body of the barrel B is generally designated 74 while the body of the stem S is generally designated 76.

The body 74 has a single nipple 78 joined to and opening into the bore 10 of the barrel body, while the body 76 of the stem has the tapered chamber 78 therein which is open at the end remote from the head H and the chamber at its outer and larger end is screw threaded as indicated at 80.

The numeral 82 designates a drip tip having the externally threaded circular body portion 84 for threaded engagement in the end of the chamber 78 and having the externally tapered tip portion 86. A flow passage 88 is formed axially through the tip 82.

The exterior surface of the body 76 is shown as having the incomplete circular flow passage 90 formed therein and communicating by way of the radial aperture 92 with the chamber 78. This flow passage 90 is preferably of gradually decreasing width from a maximum width at one end to a zero width at 94, at its other end, and it is located in a transverse plane of the body 76 for register with the end of the nipple, as shown. With this construction it will be seen that there is provided a valve or stopcock for supplying fluid in drop amounts from a burette or other apparatus, with means for controlling the drop flow.

FIG. 15 illustrates a valve structure wherein the expansion plug is provided with a transverse, through flow passage and with sealing rings on opposite sides of the passage. This construction provides additional sealing where such may be considered necessary.

In the construction of FIG. 15, the body of the stem is designated 96 and the tapered plug which is inserted in the tapered bore 98 in the body 96, is designated 100. This construction, it will be seen, is up to this point the same as the construction shown in FIGS. 9 and 10.

The plug 100 has a transverse or axial flow passage 102 which is designed, upon rotation of the stem, to align with ends of nipples, not illustrated, joined to the body 104 of the barrel. Such a nipple arrangement would be like that illustrated in FIGS. 7 and 8. An end of one such nipple is designated by the dotted line circle 106.

The expansion plug 100 is provided on opposite sides of the radial passage 102, with ring grooves 108, in each of which is positioned a gasket ring 110 which has tight engagement with the surface of the tapered bore 98 and when the expansion plug 100 is threaded inwardly it will be apparent that the hereinbefore described prestressing of the latter in the longitudinal direction thereof will also effect the compression of the rings 110.

FIGS. 16 and 17 illustrate an embodiment of the valve in which the body of the stem is provided with an encircling or girdling flow passage which communicates with two oppositely located longitudinal branches positioned to be brought into communication or register at their closed ends, simultaneously with opposite nipple openings.

In this construction the body of the barrel is generally designated 112 while the body of the stem is designated 114. Here also the circumferenitally grooved portions are formed oversize so that the sealing ribs 14 will establish a firm or tight leakproof engagement with the surface of the bore in the barrel body.

The barrel body is illustrated as having joined thereto the opposite nipples 116 which open into the bore in the illustrated manner.

The body 114 of the stem is provided with an encircling or girdling flow channel 118 which is removed axially of the stem from the aligned ends of the nipples 16. At diametrically opposite locations the surface of the body 114 is provided with the short longitudinally extending flow channels 120, each of which opens at one end into the circumferential channel 118, while the opposite or closed or blind end of each of the short channels 120 is located in the plane, transversely of the stem, of the adjacent ends of the nipples 116.

With this arrangement it will be seen that both of the axial channels 120 may be brought into registry simultaneously with the nipples so that fluid may flow from one thereof into the circumferential channel 118 from which it will then flow to the opposite nipple by way of the other axial channel 120. This construction provides for a quicker shut off of fluid flow than may be had with a straight through radial passage.

FIG. 19 illustrates the application of the invention to a multi-way valve structure.

In this figure the body of the barrel B is designated 122 while the body of the stem S is designated 124.

As shown, the barrel has joined thereto, the three nipples 126, 128 and 130. The nipples 128 and 130 are spaced apart in the longitudinal direction of the barrel, while the nipple 126 is aligned transversely of the barrel with the nipple 130.

The stem has formed circumferentially in the surface thereof, the flow channel 132 which is in the plane transversely of the barrel and stem of the nipple 128 so as to be at all times in communication with this nipple.

Selective transfer of fluid between the nipple 128 and the nipples 126 and 130 is effected by means of the single longitudinally extending short flow channel 134 formed in the surface of the stem and communicating at one end with the circumferential channel 132. The opposite or blind end of the channel 134 is in a plane transversely of the stem with the aligned nipples 126 and 130. Accordingly it will be seen that upon rotation of the stem, the blind end of the channel 134 may be brought into register with either the nipple 126 or the nipple 130. With this arrangement, communication may be established between the nipples 126 and 128 or between the nipples 128 and 130. It will also be apparent, of course, that additional nipples may be joined to the barrel body 122 and which additional nipples may be put in communication with the nipple 128.

FIG. 20 illustrates another embodiment of the valve structure, shown in association with a burette, the lower portion only of which is illustrated, and which is generally designated 136. The body 138 of the barrel B is disposed transversely of the longitudinal axis of the burette and is in communication with the outlet end of the burette through the neck aperture 140. Diametrically opposite from the body of the burette and aligned with the neck aperture 140, is the short discharge tip or nipple 142 having the neck opening 144 which is aligned with the opening 140.

In this valve construction the hollow stem body 146 of the stem is shown in association with an expansion plug 148 threaded therein to function in the same manner as the hereinbefore described expansion plugs and this expansion plug is shown as having a through radial passage 150 which is aligned with openings 152 formed in opposite sides and through the wall of the stem. Thus it will be seen that when the stem is rotated to one position fluid may be discharged from the burette to and from the tip 142, or it may be shut off by rotating the plug from the position illustrated.

FIG. 21 illustrates another method of applying pressure to the stem body for prestressing in a direction normal to the axis of the stem and housing. In this figure the body of the cylinder is designated 154 while the body of the stem S is designated 156 and the chamber formed axially in the stem, is designated 158.

Two nipples 160 are shown joined to the body 154 of the barrel for fluid connection with a flow passage or channel 162. This flow channel is shown as being incompletely circular whereby an unchannelled portion between the ends of the channel may be brought into position to close an aperture leading to one of the nipples 160 as will be readily apparent.

In this latter construction the chamber 158 of the stem is filled with granular neoprene rubber or silicone rubber 164, and there is threaded in the open end of the chamber, a compression plug 166. Thus it will be seen that when the plug 166 is threaded inwardly, pressure will be applied to the granular rubber material 164 which will produce side pressure on the valve stem body to thus ensure a tight leakproof engagement between the ribs on the stem and the surface of the bore of the barrel in which the stem is located.

FIG. 22 illustrates one of the valve structures on an enlarged scale with the barrel being in longitudinal section and the stem in elevation. This enlarged illustration shows details embodied in all of the different forms of the valves hereinbefore described, and while the stem structure is the same as that illustrated in FIG. 16, and the barrel body is shown with the two opposite nipples 116 of the structure of FIG. 16, it is to be understood that any of the other stem constructions or barrel constructions may be and preferably are formed with the details about to be described. The same reference numerals, accordingly, will be applied here as are used in the structure shown in FIG. 16.

Each of the stem bodies is formed at the upper end thereof with the encircling groove 168 which is immediately below the collar portion 12 of the stem. This groove receives the very small or low bead 170 formed around the top inside edge of the body 112 of the barrel. At the opposite end of the barrel body from the bead 170, the inside edge of the barrel bore is formed with rib 172. This is positioned to be contacted by the adjacent end of the stem body as shown. Thus the bead 170 engaging in the groove 168 establishes a locking coupling between the parts.

As hereinbefore stated, laboratory glassware valves constructed in accordance with the present invention in its different disclosed embodiments, have many advantages over valves heretofore produced where tapered plugs or stems are employed. As an example, Teflon material can be easily machined to the desired cylindrical form and grooves as stated to establish the tight leakproof connection with the enclosing barrel or sleeve. It does not have to be ground for a taper as is required in other valve structures.

Another feature of advantage is that with valves constructed in accordance with the present invention the stems are readily interchangeable and even though there may be slight variations in the circularity of the bores of the valves or sleeves of the different valves, the stems will form the desired leakproof engagement with the barrel bore. Ordinary laboratory tubing, such as would be used for forming the barrel or sleeve of the present valve may deviate from an accurate or true concentricity, as much as $10/1000$ of an inch. In such case the formation of the cylindrical stem oversize in the amount hereinbefore stated will cause the stem to conform to the slight concentricity deviation and still maintain a leakproof connection.

In conventional tapered plug or tapered stem valves, the stem is ground to fit one sleeve only and accordingly another sleeve, or a sleeve of another valve, if not of exactly the same taper, will not receive the stem since the larger end of the stem or plug would prevent its complete entry and seating. No difficulty such as this occurs in connection with valves of the present invention.

Referring now to the particular embodiment of the invention illustrated in FIGS. 23 to 26 inclusive, which differs in the respects about to be pointed out from the embodiments hereinbefore described, the barrel B and the oppositely located aligned and oppositely directed nipples 16a are formed of glass as shown and, as in the previously described embodiments, the bore 10 formed axially through the barrel is of constant diameter throughout and the ends of the barrel may be beaded as indicated at s or formed straight or square across as in the previous structures.

The bore 16b of each nipple tapers to a reduced diameter where it opens into the bore 10 of the barrel, as indicated at 20a.

The stem or plug S is formed with the two aligned axial chambers 200 and 202.

The plug body, which is here illustrated as being exteriorly circular or cylindrical throughout its length, is formed at one end with the head H', the outside diameter of which head is materially greater than the portion of the plug which is designed to extend in and through the bore 10 of the barrel. The chamber 202 opens through the head end of the plug as shown in FIG. 25 while the chamber 200 opens to the opposite end of the plug and these chambers at their inner ends are separated by a solid intermediate or wall portion of the plug body as indicated at 204 and upon opposite sides of this middle solid portion of the plug body the exterior surface is provided with the multiplicity of encircling grooves 206 and 208 which correspond to the previously referred to grooves 14, in number, width and depth, thereby forming upon both sides of the solid central portion of the plug the relatively fine encircling ribs 210 and 212, corresponding to the fine circular ribs 14a hereinbefore described.

The head H' is provided with the transverse opening to receive a cross bar or cross arm 216.

Figure 25:
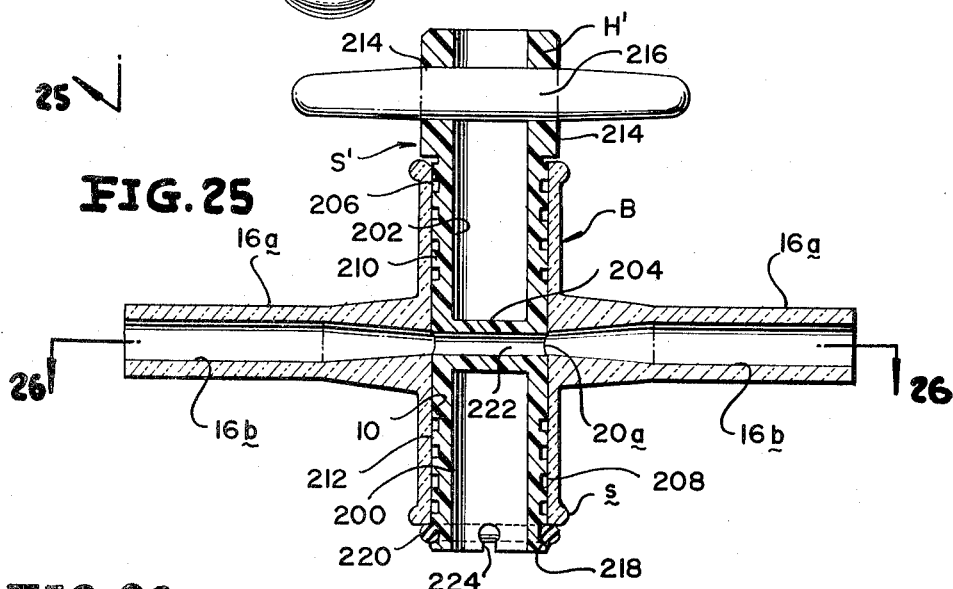
FIG. 25 is a vertical section taken through the stopcock structure substantially in the plane of section line 25—25 on FIG. 23.
Figure 26:
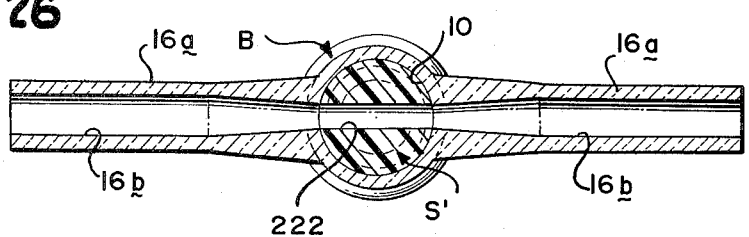
FIG. 26 is a horizontal section taken substantially in the transverse plane of section line 26—26 of FIG. 25.

The opposite end of the plug or stem has formed exteriorly therearound, a channel 218 designed to receive the elastic ring 220 which, when lying in the channel, projects outwardly a substantial distance beyond the outside diameter of the adjacent grooved portion of the plug body and, as shown in FIG. 25, when the plug body has been inserted into the barrel to the limit permitted by the head portion, which may abut one end of the barrel, the channel 218 will lie outside of the opposite end portion of the barrel. In other words, the end of the plug in which the channel 218 is formed, will project beyond the end of the barrel when the stem or plug is inserted thereinto as shown and thus the ring 220 when applied in the channel 218, will block or prevent the withdrawal or extraction of the plug from the barrel. Also, when the plug has been inserted to the extent permitted by the head, the transverse bore or passage 222, which is formed through the middle solid portion 204, will be disposed at the proper position within the barrel where it can be brought into alignment with the opposite openings 20a of the nipples 16a.

It will be understood that in this embodiment of the invention illustrated in FIGS. 23 to 26 the plug or stem will be made slightly oversize with respect to the diameter of the bore 10 of the barrel, as described in connection with the description of the preceding figures, whereby the stem when forced into the barrel will be placed under stress, particularly the fine encircling ribs 210 and 212 thereof, whereby an effective gas and liquid tight seal will be established to prevent leakage of fluids along the surface of the bore 10 of the barrel between the same and the outer surface of the stem.

The arm or bar 216 which is extended through the opposite openings 214 in the head, may be made of glass, plastic or any other suitable material.

At the end of the plug or stem remote from the head, the edge of the chamber wall is slit or notched as indicated at 224 which facilitates the application and removal of the locking ring 220 by permitting a slight compression of the stem.

From the foregoing it will be apparent that there is provided by the present invention a new and novel laboratory valve structure which has new and unexpected results and advantages over other types of valves.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A valve comprising a length of glass tubing open at its ends and forming a rotary plug barrel having open ends, said barrel having a straight cylindrical bore of substantially constant diameter extending therethrough from end to end, plural glass tubular means joined to said barrel and opening thereinto, a cylindrical thermoplastic plug of substantially constant overall diameter fitting in said bore for rotation therein, means carried by said plug facilitating axial rotation thereof in the bore, flow passage forming means in said plug and positioned for establishing communication between said plural tubular means upon rotation of the plug to one position, said plug being formed in a portion thereof between each end thereof and said flow passage with a multiplicity of minute encircling closely spaced ribs oversize at least approximately $10/1000$ of an inch with respect to the diameter of said bore and highly compressed in the bore to maintain a leakproof engagement against the surface of the wall of the bore, said plug having axially extending chambers therein spaced apart and separated intermediate their ends by a solid portion of the body of the plug through which said flow passage forming means extends, and said chambers opening at the opposite ends thereof through the adjacent ends of the plug and through the open ends of the barrel.

2. The invention as defined by claim 1, wherein said plug is formed at one end to provide a head having an outside diameter greater than the diameter of said bore of the barrel, said head limiting the insertion of the plug in one direction into the barrel, said plug when inserted into the barrel bore to the limit permitted by said head having an unreduced, full diameter portion of the end thereof remote from the head extended beyond the adjacent end of the barrel, and means on and encircling said extended end portion of the plug for securing the plug against withdrawal from the bore.

3. The invention as defined by claim 2, wherein the said means for preventing withdrawal of the plug from the bore comprises an annular elastic member having an outside diameter materially greater than the diameter of the said bore and engaging the adjacent end of the barrel.

References Cited by the Examiner

UNITED STATES PATENTS

| | | | |
|---|---|---|---|
| 2,864,580 | 12/1958 | Lemoine | 251—368 X |
| 2,926,885 | 3/1960 | Szulc et al. | 251—214 |
| 3,012,752 | 12/1961 | Buck | 251—309 |
| 3,124,335 | 3/1964 | Mason | 251—309 X |
| 3,142,474 | 7/1964 | Von Nelson | 251—309 |
| 3,173,448 | 3/1965 | Jones | 251—209 X |
| 3,185,179 | 5/1965 | Harautuneian | 251—368 X |

FOREIGN PATENTS 1,110,481   7/1961   Germany.

M. CARY NELSON, *Primary Examiner.*

MARTIN P. SCHWADRON, *Examiner.*

R. J. MILLER, *Assistant Examiner.*